United States Patent
Mohsenian et al.

(10) Patent No.: US 10,987,847 B1
(45) Date of Patent: Apr. 27, 2021

(54) DIE STRUCTURE

(71) Applicants: Ehsan Mohsenian, Tehran (IR); Ehsan Ghobadi, Stuttgart (DE)

(72) Inventors: Ehsan Mohsenian, Tehran (IR); Ehsan Ghobadi, Stuttgart (DE)

(*) Notice: Subject to any disclaimer, the term of this patent is extended or adjusted under 35 U.S.C. 154(b) by 0 days.

(21) Appl. No.: 16/697,235

(22) Filed: Nov. 27, 2019

(51) Int. Cl.
| | |
|---|---|
| *B29C 48/25* | (2019.01) |
| *B29C 48/325* | (2019.01) |
| *B29C 48/33* | (2019.01) |
| *B29C 48/32* | (2019.01) |
| *B29C 48/30* | (2019.01) |
| *B29C 48/255* | (2019.01) |

(52) U.S. Cl.
CPC ...... *B29C 48/3003* (2019.02); *B29C 48/2556* (2019.02); *B29C 48/2562* (2019.02); *B29C 48/32* (2019.02); *B29C 48/327* (2019.02); *B29C 48/33* (2019.02)

(58) Field of Classification Search
CPC ............ B29C 48/2556; B29C 48/2562; B29C 48/3003; B29C 48/32; B29C 48/325; B29C 48/327; B29C 48/33
See application file for complete search history.

(56) References Cited

FOREIGN PATENT DOCUMENTS

| | | | | |
|---|---|---|---|---|
| DE | 19634556 A1 | * | 3/1998 | ............ B29C 48/30 |
| DE | 19727722 A1 | * | 3/1998 | ............ B29C 48/05 |
| DE | 10110084 A1 | * | 10/2002 | ............ F16L 11/15 |
| DE | 102014001961 A1 | * | 8/2015 | ........... B29C 70/521 |

OTHER PUBLICATIONS

Machine translation of DE 196 34 556 A1. No date.*
Machine translation of DE 197 27 722 A1. No date.*
Machine translation of DE 101 10 084 A1. No date.*
Machine translation of DE 10 2014 001 961 A1. No date.*

* cited by examiner

*Primary Examiner* — Xiao S Zhao
*Assistant Examiner* — Joseph S Leyson
(74) *Attorney, Agent, or Firm* — Summit Patent Group

(57) ABSTRACT

A die structure is provided. The die structure may have a die body, a mandrel having a magnet and/or one or more magnet assemblies, a first magnetic structure, a second magnetic structure and/or one or more magnetic structures. The first magnetic structure may be configured to apply a first magnetic force to the mandrel, in a first direction. The second magnetic structure may be configured to apply a second magnetic force to the mandrel, in a second direction opposite the first direction. The one or more magnetic structures may be configured to apply one or more magnetic forces to the mandrel. Application of the first magnetic force, the second magnetic force and/or the one or more magnetic forces to the mandrel supports the mandrel to be levitated within the die body and/or causes the mandrel to rotate and/or to maintain a position within the die body.

20 Claims, 11 Drawing Sheets

BB ⟶

DIE STRUCTURE

TECHNICAL FIELD

The present disclosure generally relates to die structures and particularly to die structures in extrusion machines.

BACKGROUND

An extrusion machine (e.g., an extruder) may be used to manufacture plastic pipes, bags, etc. made of one or more of plastics, wood-plastic composites (WPCs), metals, metal alloys and/or other flowable materials. For example, the extrusion machine may have one or more components configured to conduct a material through a die to form an extrudate.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, an extrusion machine (e.g., an extruder) is provided. The extrusion machine may comprise a die structure. The die structure may comprise a die body, a mandrel, a first magnetic structure coupled to a first portion of the die body, a second magnetic structure coupled to a second portion of the die body and/or one or more magnetic structures coupled to a third portion of the die body. In some examples, the mandrel comprises one or more magnet assemblies and/or a first magnet extending from a first side of the mandrel to a second side of the mandrel. In some examples, a first magnet assembly of the one or more magnet assemblies comprises one or more first magnets. The third portion of the die body may be between the first portion of the die body and the second portion of the die body. At least a portion of the mandrel may be within the third portion of the die body. The first magnetic structure may be configured to apply a first magnetic force to the mandrel, in a first direction. The second magnetic structure may be configured to apply a second magnetic force to the mandrel, in a second direction opposite the first direction. The one or more magnetic structures may be configured to apply one or more magnetic forces to the mandrel. Application of the first magnetic force, the second magnetic force and/or the one or more magnetic forces to the mandrel may support the mandrel to be levitated within the die body and/or may cause the mandrel to maintain a position within the die body and/or to rotate around a first axis of rotation.

In an example, an extrusion machine is provided. The extrusion machine may comprise a die structure and/or one or more components configured to conduct a flowable material to and/or through the die structure. The die structure may comprise a die body, a mandrel, a first magnetic structure coupled to a first portion of the die body, a second magnetic structure coupled to a second portion of the die body and/or one or more magnetic structures coupled to a third portion of the die body. In some examples, the mandrel comprises one or more magnet assemblies and/or a first magnet. In some examples, the die body comprises a first side and a second side. In some examples, the die body may be configured and/or disposed such that the flowable material moves from the first side of the die body to the second side of the die body. For example, the flowable material may flow and/or be conducted through the die body, from the first side of the die body to the second side of the die body. The first side of the die body may be lower than or higher than the second side of the die body. In some examples, a first magnet assembly of the one or more magnet assemblies comprises one or more first magnets. The third portion of the die body may be between the first portion of the die body and the second portion of the die body. At least a portion of the mandrel may be within the third portion of the die body. The first magnetic structure may be configured to apply a first magnetic force to the mandrel, in a first direction. The second magnetic structure may be configured to apply a second magnetic force to the mandrel, in a second direction opposite the first direction. The one or more magnetic structures may be configured to apply one or more magnetic forces to the mandrel. Application of the first magnetic force, the second magnetic force and/or the one or more magnetic forces to the mandrel may support the mandrel to be levitated within the die body and/or may cause the mandrel to maintain a position within the die body and/or to rotate around a first axis of rotation of the mandrel.

In an example, a die structure is provided. The die structure may comprise a die body, a mandrel, a first magnetic structure coupled to a first portion of the die body and/or a second magnetic structure coupled to a second portion of the die body. In some examples, the mandrel comprises a first magnet. At least a portion of the mandrel may be within a third portion of the die body. The third portion of the die body may be between the first portion of the die body and the second portion of the die body. The first magnetic structure may be configured to apply a first magnetic force to the mandrel, in a first direction. The second magnetic structure may be configured to apply a second magnetic force to the mandrel, in a second direction opposite the first direction. Application of the first magnetic force and/or the second magnetic force to the mandrel may support the mandrel to be levitated within the die body and/or may cause the mandrel to maintain a position within the die body.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices or any combination thereof.

Figure 1:
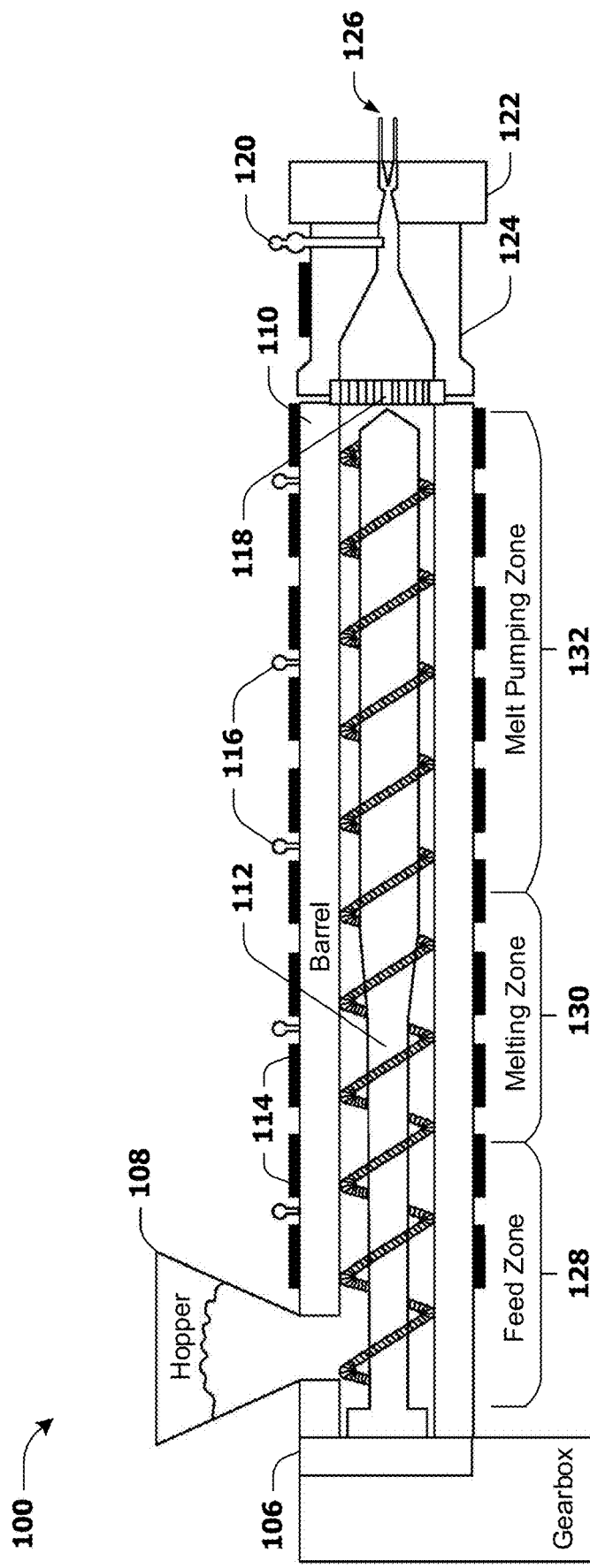
FIG. 1 illustrates an exemplary extrusion machine.

FIG. 1 illustrates a first extrusion machine 100. In some examples, the first extrusion machine 100 may comprise one or more of a motor 102, a gearbox 104, a thrust bearing component 106, a hopper 108, a barrel 110, one or more rotating screws 112, one or more barrel components 114, one or more thermocouples 116, a filter 118, one or more melt thermometers and/or temperature controllers 120, a die 122 (e.g., a mold) and/or an adapter 124. In some examples, a material within the hopper 108 may travel (e.g., by gravity) to a feeding throat and/or arrive within the barrel 110 and/or onto the one or more rotating screws 112. For example, the material may drop into a feeding zone 128 of the barrel 110. In some examples, the material within the hopper 108 may comprise granules, pellets and/or resin.

In some examples, the barrel 110 may be heated (and/or cooled) via the one or more barrel components 114 (e.g., the one or more barrel components 114 may correspond to one or more barrel heaters and/or one or more barrel coolers). In some examples, the one or more rotating screws 112 may rotate to conduct the material in a forward direction (e.g., towards the adapter 124) through the barrel. In an embodiment where the one or more rotating screws 112 comprise more than one screw, the rotating screws 112 may rotate in a same direction (e.g., a co-rotation twin-screw extruder) and/or in an opposite direction (e.g., a counter-rotation twin-screw extruder). Alternatively and/or additionally, a cross-sectional diameter of a body of the one or more rotating screws 112 (e.g., a root of a rotating screw) may increase in the forward direction such that a channel depth through which the material is conducted may decrease in the forward direction and/or the material is conducted through a smaller area. In some examples, heat may be generated and/or shear heating may be applied to the material by way of rotation of the one or more rotating screws 112 and/or compression on the material as a result of the material being conducted through the smaller area. In some examples, the shear heating and/or the one or more barrel components 114 may melt the material to form a flowable material (e.g., a melted and/or a pliable material). For example, the flowable material may be formed within a melting zone 130 of the barrel 110.

In some examples, the flowable material may be conducted (e.g., pumped) in the forward direction (e.g., towards the adapter 124) using the one or more rotating screws 112. For example, the flowable material may be conducted in the forward direction within a melt pumping zone 132 of the barrel 110. In some examples, the flowable material may be conducted through the filter 118 and/or the adapter 124 to and/or through the die 122. In some examples, the filter 118 may comprise one or more screens (e.g., a screen pack that may be supported by a breaker plate) configured to filter contaminants from the flowable material.

In some examples, the flowable material may be conducted to and/or through the die 122 to form an extrudate 126. In some examples, the extrudate 126 may correspond to one or more of a pipe (e.g., a pipe made of polyolefin and/or one or more other materials, a pipe for conveyance of fluids such as water, natural gas, sewage, etc.), a tube, a hose, an annulus film and/or a different extrudate used to form bags, a micro-scaled hollow filament and/or a different micro-scaled hollow extrudate (e.g., a micro-pipe), a nano-scaled hollow filament and/or a different nano-scaled hollow extrudate (e.g., a nano-pipe), an artificial vessel (e.g., a bio-degradable and/or bio-compatible artificial vessel, such as an artificial vein), a different object with an annulus profile, a product with a hollow profile, etc. Alternatively and/or additionally, the extrudate 126 may comprise multiple layers (e.g., the extrudate 126 may correspond to one or more of a multi-layer pipe, a multi-layer tube, a multi-layer hose, etc.). In an example where the extrudate 126 comprises multiple layers, multiple extrusion machines may be configured to conduct one or more flowable materials to the die 122 to form the extrudate 126.

Alternatively and/or additionally, the extrudate 126 may be used to produce one or more bags (e.g., one or more of plastic bags, garbage bags, etc.). In an example where the extrudate 126 is used to produce the one or more bags, the extrudate 126 may correspond to a tube (e.g., a bubble) that is extruded via the die 122 vertically. Alternatively and/or additionally, the first extrusion machine 100 may be configured to cool the extrudate 126 (e.g., the extrudate 126 may be cooled using air and/or an air ring). Alternatively and/or additionally the first extrusion machine 100 may be configured to inflate the extrudate 126 to a desired diameter and/or thickness (e.g., by using air). It may be appreciated that some instruments (e.g., equipment, devices, apparatus, etc.) other than and/or along with the extrusion machine 100 are used for cooling, inflating and/or adjusting the diameter and/or thickness of the extrudate 126. Alternatively and/or additionally, the extrudate 126 may be drawn (e.g., pulled) while being cooled. A cooled portion of the extrudate 126 may be flattened (such as by using a collapsing frame and/or one or more nip rolls) and/or rolled using one or more idler rolls to produce a roll of film. In some examples the extrudate may be produced vertically and/or horizontally and/or in other directions.

Figure 2A:
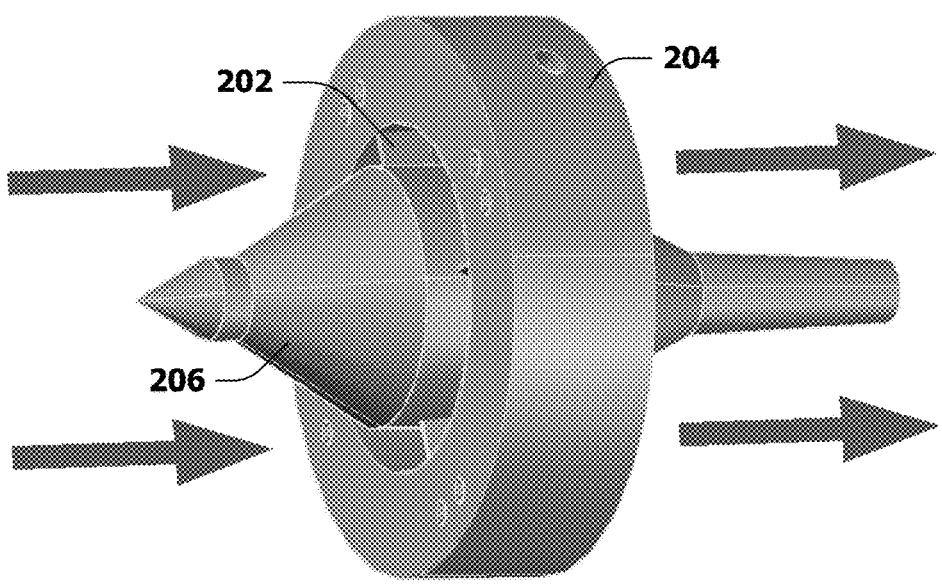
FIG. 2A illustrates an exemplary die.

FIG. 2A illustrates an embodiment 200 of the die 122. In some examples, the embodiment 200 of the die 122 may comprise an exemplary die body 204 and/or an exemplary mandrel 206. In some examples, at least a portion of the exemplary mandrel 206 may be within the exemplary die body 204. In some examples, flowable material may be conducted through the exemplary die body 204. In some examples, the flowable material may pass through a space (e.g., a clearance) between the exemplary die body 204 and the exemplary mandrel 206 to form the extrudate 126.

In some examples, the exemplary mandrel 206 may comprise one or more mechanical supports 202 (e.g., one or more of pedestals, legs, fins, etc.) configured to connect the exemplary die body 204 to the exemplary mandrel 206. In some examples, as the flowable material passes through the space between the exemplary die body 204 and the exemplary mandrel 206, a separation of the flowable material may occur at each mechanical support of the one or more mechanical supports 202.

Figure 2B:
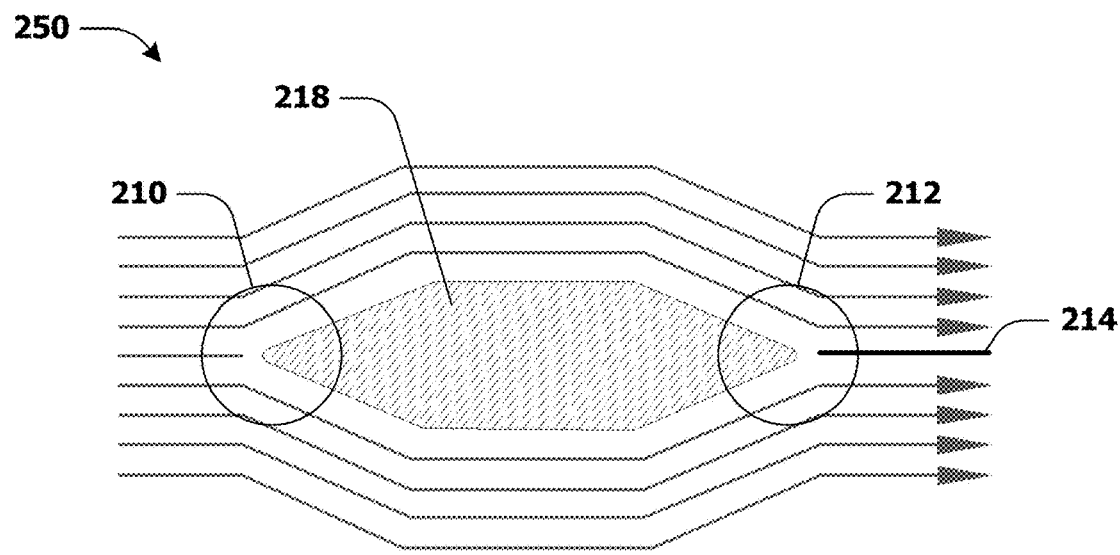
FIG. 2B illustrates a cross-sectional view of a separation and/or a reconnection of flowable material at a mechanical support of a mandrel.
Figure 2C:
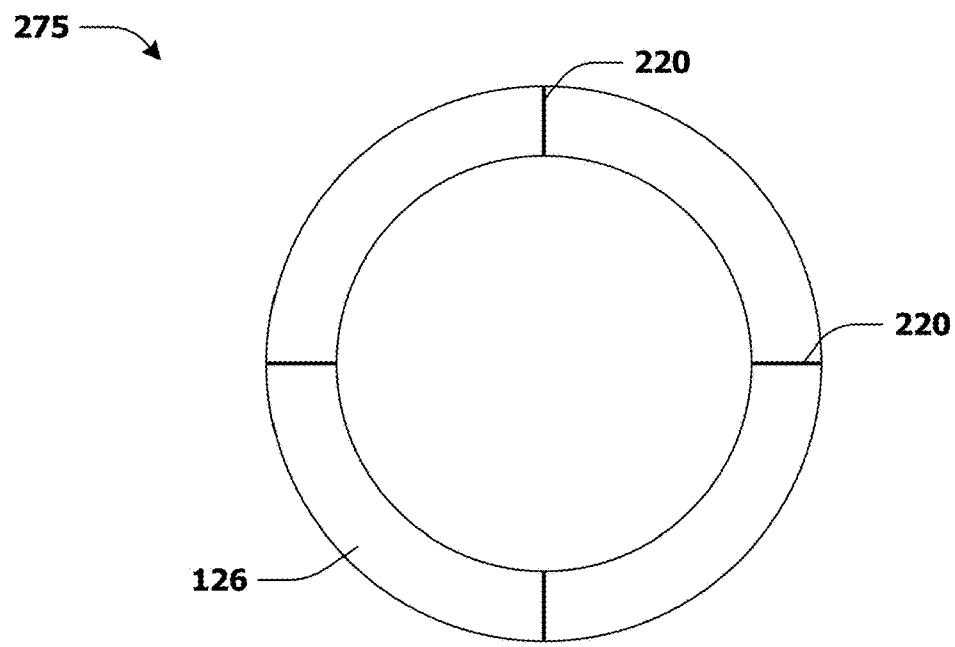
FIG. 2C illustrates a cross-sectional view of an extrudate.

FIG. 2B illustrates a cross-sectional view 250 of a separation of the flowable material at a mechanical support 218 of the one or more mechanical supports 202 as the flowable material passes through the space between the exemplary die body 204 and the exemplary mandrel 206. As the flowable material passes through the space between the exemplary die body 204 and the exemplary mandrel 206, the melted material may separate and/or sub-streams may be formed at a first point 210. Sub-streams of the flowable material may reconnect at a second point 212. A connection line 214 (e.g., knit-lines and/or weld lines) may be formed within the extrudate 126 as a result of the reconnection at the second point 212. FIG. 2C illustrates a cross-sectional view 275 of the extrudate 126 formed using the embodiment 200 of the die 122. The extrudate 126 may comprise one or more connection lines 220 as a result of separation of the flowable material at the first point 210 and/or reconnection of the flowable material at the second point 212 of one mechanical support or each mechanical support of the one or more mechanical supports 202. The one or more connection lines 220 may extend along (a length of) the extrudate 126 and/or a hollow product.

In some examples, the one or more connection lines 220 may be associated with a reduction of uniformity of the extrudate 126 and/or a potential reduction of strength of the extrudate 126. For example, stress concentration may be intensified at the one or more connection lines 220 and/or the extrudate 126 may have a lower resistance to internal and/or external pressure due to the one or more connection lines 220 and/or reduced uniformity.

Die embodiments different than the embodiment 200 of the die 122, such as basket dies (e.g., lattice-basket dies, dividing sleeve dies and/or screen pack dies) and/or helix dies, have been used to produce an extrudate having a higher uniformity. However, extrudates produced using the die embodiments different than the embodiment 200 of the die 122 have connection lines causing a reduction of uniformity issues and/or potential lower resistances to internal and/or external pressure imposed on walls of the (hollow) extrudate during the service time of the respective product.

With respect to one or more of the structures and/or techniques presented herein, one or more embodiments of a die structure are provided that are configured to form an extrudate that may not have connection lines, with improved uniformity and/or improved mechanical properties.

Figure 3A:
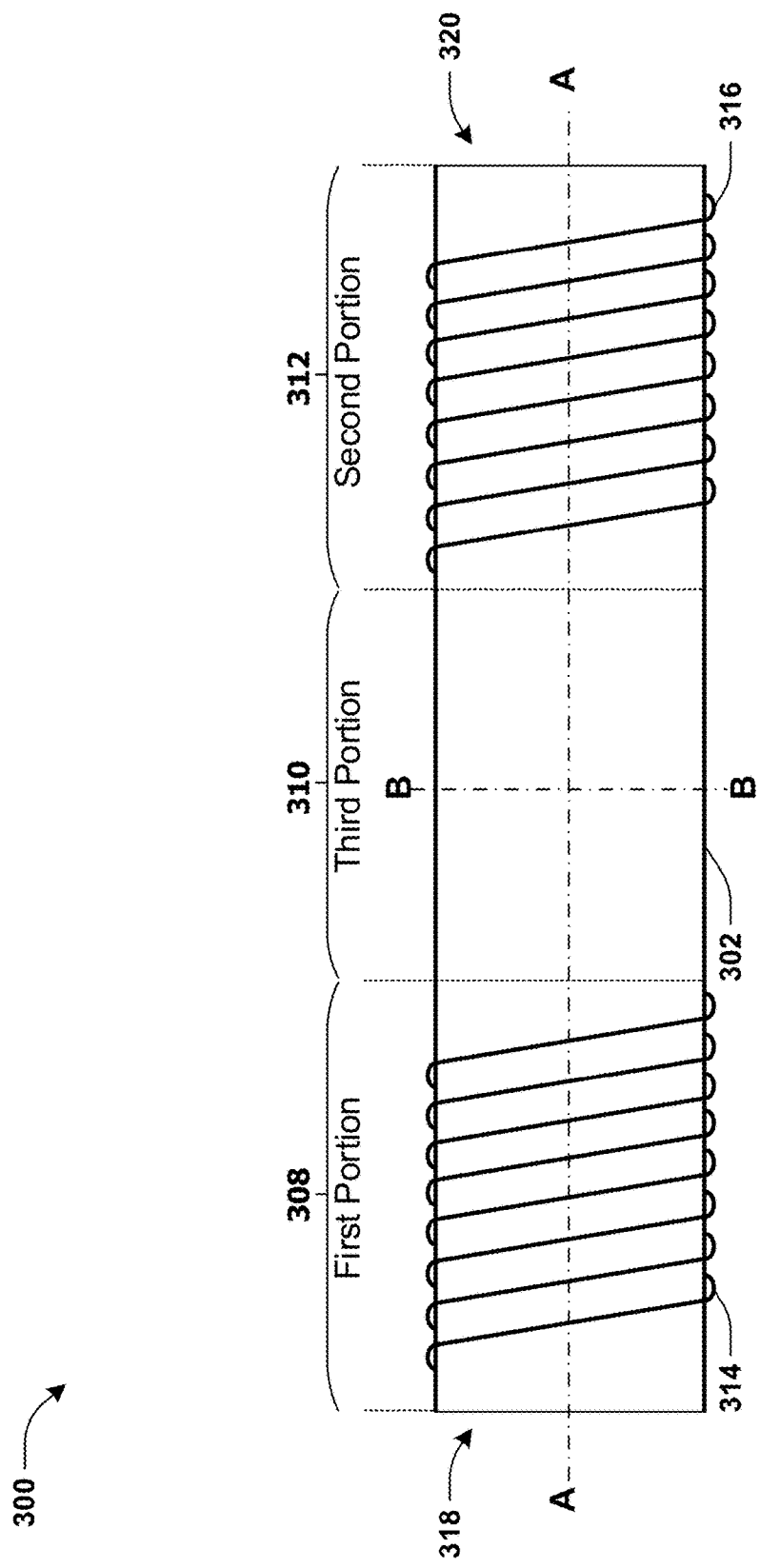
FIG. 3A illustrates an exemplary embodiment of a die structure.

FIG. 3A illustrates an exemplary embodiment of a die structure 300. The die structure 300 may comprise a die body 302 comprising a first side 318 and/or a second side 320. In some examples, the die body 302 may be configured and/or disposed such that flowable material 304 (illustrated in FIG. 3B) moves from the first side 318 of the die body 302 to the second side 320 of the die body 302. For example, the flowable material 304 may move from the first side 318 of the die body 302 to the second side 320 of the die body 302 (e.g., the flowable material 304 may flow and/or be conducted through the die body 302, from the first side 318 of the die body 302 to the second side 320 of the die body 302). Alternatively and/or additionally, the die body 302 may be configured to conduct the flowable material 304 from the first side 318 of the die body 302 to the second side 320 of the die body 302. For example, the die body 302 may be configured as a path for the flowable material 304 to move and/or flow from the first side 318 of the die body 302 to the second side 320 of the die body 302.

In some examples, the flowable material 304 may comprise a melted material and/or a pliable material. Alternatively and/or additionally, the flowable material 304 may comprise a material with a fluidity that is higher than a threshold fluidity (such that the flowable material 304 may flow through the die body 302). In some examples, the flowable material 304 may comprise one or more plastics, such as one or more of a polyolefin plastic, polyethylene (e.g., one or more of high density polyethylene, low density polyethylene, etc.), polypropylene, polyvinyl-chloride, polyethylene terephthalate, thermoplastic elastomers, acrylonitrile butadiene styrene, polyphenylene oxide, nylon, polyamides, polycarbonate, polyester, polyester, urethane, polyurethane, acrylic, polystyrene, other thermoset and/or thermoplastic materials and/or composites, etc. Alternatively and/or additionally, the flowable material 304 may comprise rubbers, elastomers and/or elastomeric composites. Alternatively and/or additionally, the flowable material 304 may comprise a wood-plastic composite (WPC) and/or other composites. Alternatively and/or additionally, the flowable material 304 may comprise a metal and/or a metal alloy. Alternatively and/or additionally, the flowable material 304 may comprise one or more pastes and/or one or more other chemical mixtures, emulsions and/or solutions (e.g., in one or more forms and/or states, such as homogeneous, heterogeneous, single-phase, double-phase, multi-phase, etc.). Alternatively and/or additionally, the flowable material 304 may comprise one or more bio-degradable materials and/or bio-compatible materials. Alternatively and/or additionally, the flowable material 304 may comprise a different material not listed herein.

In some examples, the second side 320 may correspond to an opening of the die body 302 through which a formed extrudate is conducted. Alternatively and/or additionally, the die structure 300 may comprise a mandrel 306 (illustrated in FIG. 3B). In some examples, the die structure 300 may comprise a first magnetic structure 314 coupled to a first portion 308 of the die body 302 and/or a second magnetic structure 316 coupled to a second portion 312 of the die body 302. For example, the first magnetic structure 314 and/or the second magnetic structure 316 may be coupled to an outer surface of the die body 302. In some examples, at least a portion of the mandrel 306 may be within a third portion 310 of the die body 302. The third portion 310 may be between the first portion 308 of the die body 302 and the second portion 312 of the die body 302.

In some examples, the first magnetic structure 314 may surround the first portion 308 of the die body 302 and/or the second magnetic structure 316 may surround the second portion 312 of the die body 302. In some examples, the first magnetic structure 314 may comprise a permanent magnet. For example, the permanent magnet may correspond to a hollow magnetic structure (e.g., a hollow cylindrical magnet and/or a hollow magnetic structure having a shape other than cylindrical) positioned around the first portion 308 of the die body 302. Alternatively and/or additionally, the first magnetic structure 314 may comprise a first electromagnet. For example, the first electromagnet may comprise a coil (of wire). The coil may be wrapped around the first portion 308 of the die body 302 and/or a bobbin. In some examples, electric current, such as direct current (and/or alternating current), may be input to the first electromagnet and/or travel through the first electromagnet to produce a magnetic field and/or to induce poles of the first electromagnet.

Alternatively and/or additionally, the second magnetic structure 316 may comprise a permanent magnet. For example, the permanent magnet may correspond to a hollow magnetic structure (e.g., a hollow cylindrical magnet and/or a hollow magnetic structure having a shape other than cylindrical) positioned around the second portion 312 of the die body 302. Alternatively and/or additionally, the second magnetic structure 316 may comprise a second electromagnet. For example, the second electromagnet may comprise a coil (of wire). The coil may be wrapped around the second portion 312 of the die body 302 and/or a bobbin. In some examples, electric current, such as direct current (and/or alternating current), may be input to the second electromagnet and/or travel through the second electromagnet to produce a magnetic field and/or to induce poles of the second electromagnet.

Figure 3B:
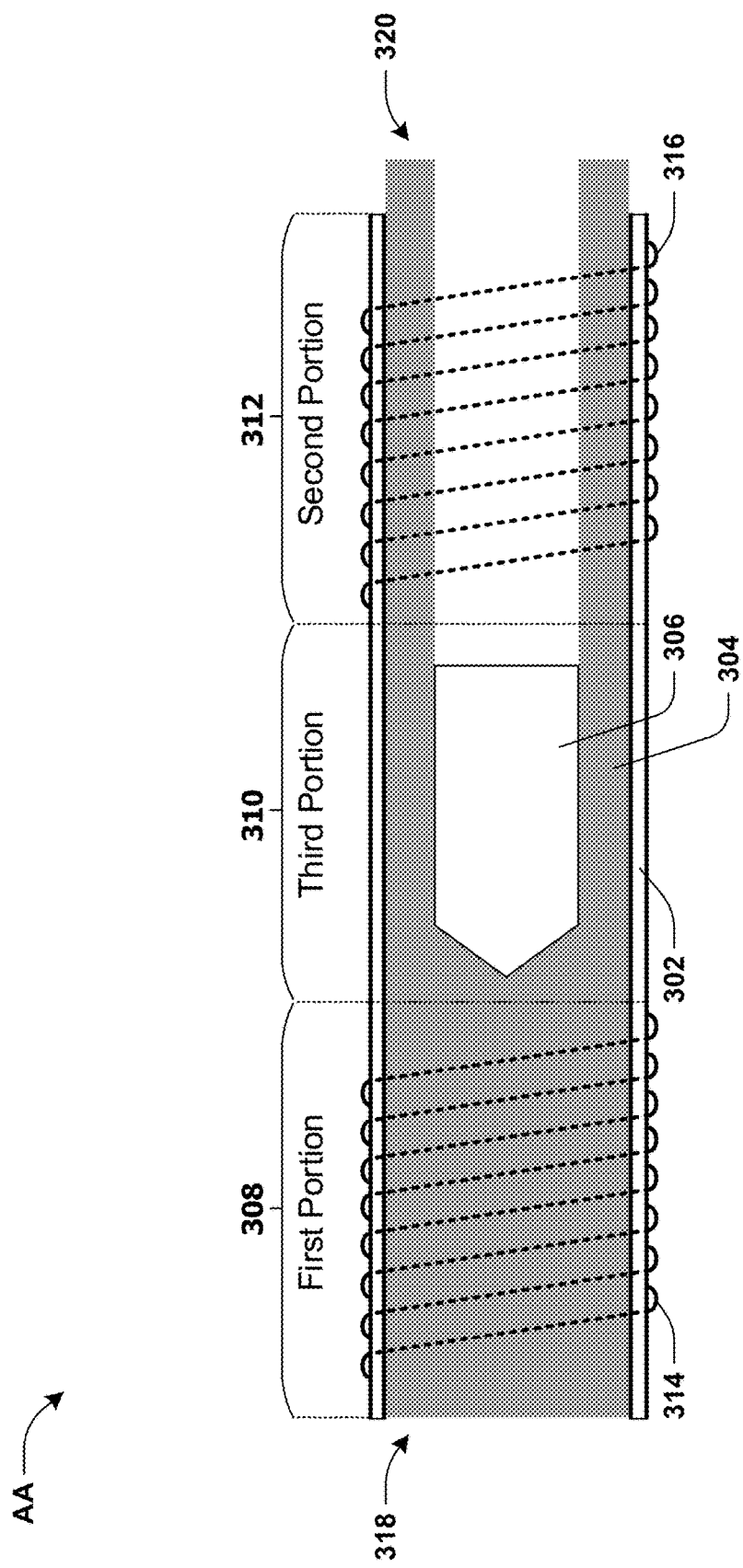
FIG. 3B illustrates a cross-section of a die structure.

FIG. 3B illustrates a cross-section AA, defined in FIG. 3A, of the die structure 300, where the flowable material 304 moves from the first side 318 of the die body 302 to the second side 320 of the die body 302 (e.g., the flowable material 304 may flow and/or be conducted from the first side 318 of the die body 302 to the second side 320 of the die body 302). In some examples, the die structure 300 is configured to form an extrudate as the flowable material 304 flows (and/or is forced, pushed, pulled, pumped and/or screw-pumped) through a space (e.g., a clearance) between an inner surface of the die body 302 and the mandrel 306 of the die structure 300. For example, the extrudate may be conducted through the second side 320 (e.g., the opening) of the die body 302 to outside of the die structure 300. The extrudate may have an annulus profile and/or a hollow profile different than the annulus profile.

Figure 3C:
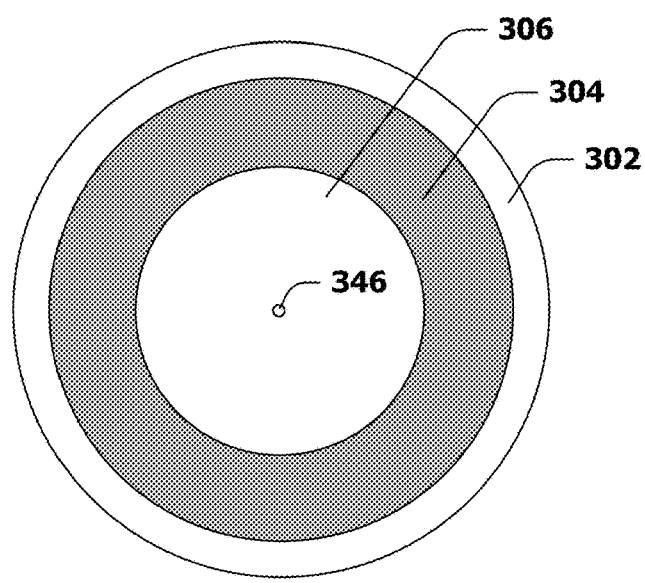
FIG. 3C illustrates a cross-section of a die structure.

FIG. 3C illustrates a cross-section BB, defined in FIG. 3A, of the die structure 300. The cross-section BB illustrates the die body 302 surrounding the flowable material 304 and/or the mandrel 306. The cross-section BB illustrates the flowable material 304 flowing through the space between the inner surface of the die body 302 and the mandrel 306. Embodiments are contemplated where the die body 302 corresponds to one or more of a cylindrical shape, a conical shape, a truncated conical shape, a prism (e.g., a star prism, a hexagonal prism, an octagonal prism and/or a different type of prism), etc. The cross-section BB illustrates an embodiment of the die structure 300 where the die body 302 (and/or at least a portion of the die body 302) corresponds to a cylindrical structure (e.g., a cylindrical shell). Embodiments are contemplated where the mandrel 306 corresponds to one or more of a cylindrical shape, a conical shape, a prism (e.g., a star prism, a hexagonal prism, an octagonal prism and/or a different type of prism), etc. Alternatively and/or additionally, the cross-section BB illustrates an embodiment of the die structure 300 where the mandrel 306 (and/or at least a portion of the mandrel 306 and/or at least a portion of the die body 302) corresponds to a cylindrical structure.

Figure 3D:
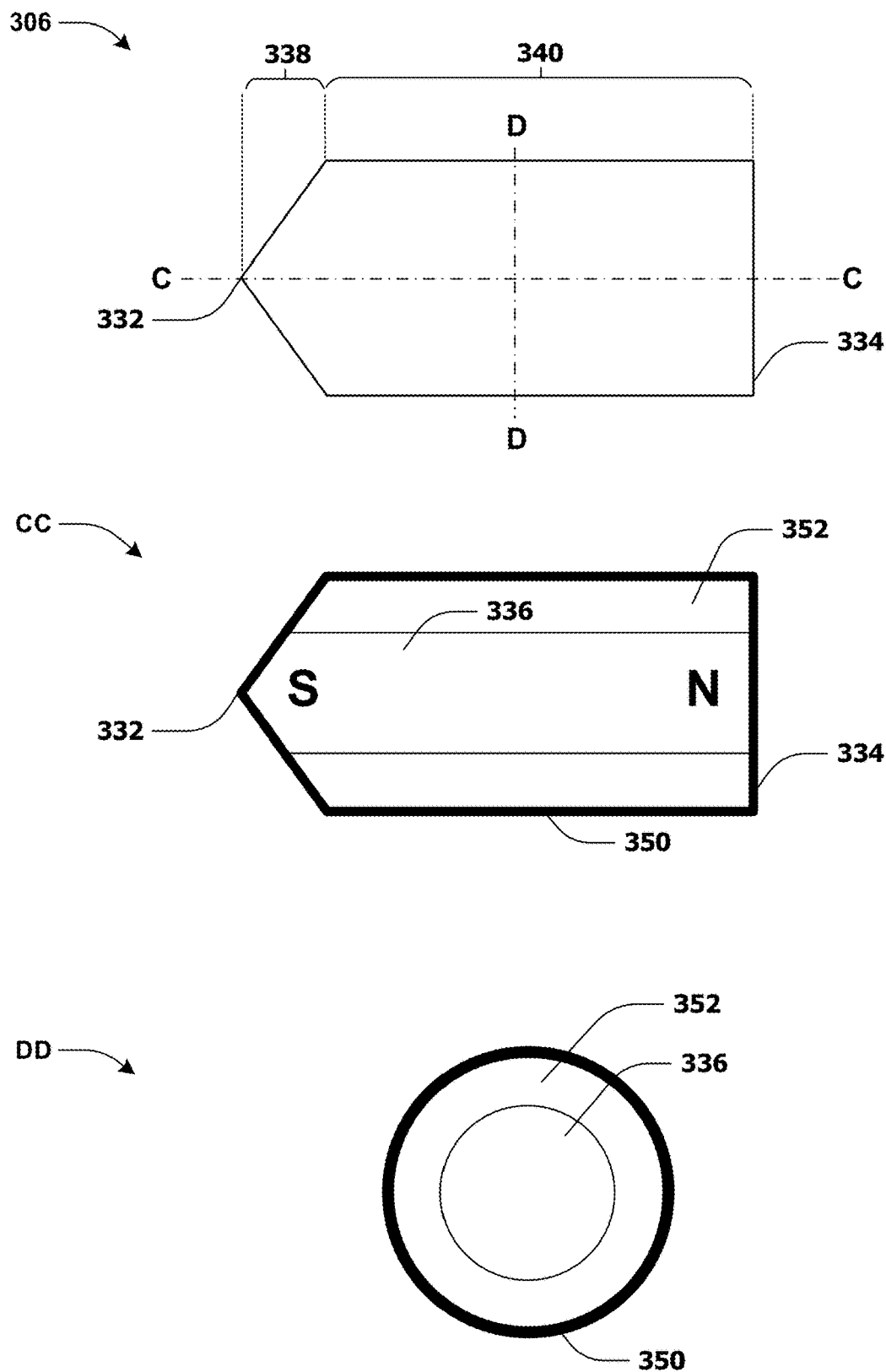
FIG. 3D illustrates a mandrel.

FIG. 3D illustrates the mandrel 306. In some examples, a first portion 338 of the mandrel 306 may have an ogive shape, a truncated ogive shape, a hemispherical shape, a truncated hemispherical shape, a dome shape, a truncated dome shape, a conical shape, a truncated conical shape, a cylindrical shape and/or a different shape. Alternatively and/or additionally, a second portion 340 of the mandrel 306 may have an ogive shape, a truncated ogive shape, a hemispherical shape, a truncated hemispherical shape, a dome shape, a truncated dome shape, a conical shape, a truncated conical shape, a cylindrical shape and/or a different shape. In some examples, the mandrel 306 may comprise a first magnet 336. In some examples, the first magnet 336 may extend from a first side 332 of the mandrel 306 to a second side 334 of the mandrel 306. Alternatively and/or additionally, the first magnet 336 may not extend from the first side 332 of the mandrel 306 to the second side 334 of the mandrel 306. The first magnet 336 is illustrated in a cross-section CC and a cross-section DD of the first mandrel 306.

In some examples, the mandrel 306 may comprise a chamber 352 (e.g., an enclosed space). In some examples, the chamber 352 may correspond to an empty space (e.g., a hollow, a cavity, a void, etc.) within the mandrel 306. Alternatively and/or additionally, the chamber 352 may be at least partially filled with one or more of a gas, a liquid, a solid material (e.g., wood, plastic, etc.), etc. The chamber 352 and/or the first magnet 336 may be arranged within a mandrel shell 350 of the mandrel 306 (e.g., an outer mandrel layer 350 of the mandrel 306). In some examples, the chamber 352 may be between the first magnet 336 and the mandrel shell 350. It may be appreciated that the chamber 352 being at least partially filled with material (and/or a lack of material) having a density lower than a density of the flowable material 304, a buoyancy force may be applied on the mandrel 306 in a direction opposite the force of gravity (e.g., such that a weight of the mandrel 306 is at least partially compensated).

In some examples, the first magnet 336 may correspond to a permanent magnet, such as a permanent dipole magnet and/or a hard dipole magnet. FIG. 3D illustrates an embodiment of the mandrel 306 where a South pole of the first magnet 336 (e.g., a positive side of the first magnet 336) corresponds to the first side 332 of the mandrel 306 and/or a North pole of the first magnet 336 (e.g., a negative side of the first magnet 336) corresponds to the second side 334 of the mandrel 306. In a different embodiment, a North pole of the first magnet 336 may correspond to the first side 332 of the mandrel 306 and/or a South pole of the first magnet 336 may correspond to the second side 334 of the mandrel 306. In some examples, the first magnet 336 may be resistant to external conditions such as one or more of temperature changes (e.g., the South pole and the North pole of the first magnet 336 may not change positions and/or a magnetic strength of the first magnet 336 may not change considerably as a result of temperature changes of the first magnet 336), humidity, magnetic fields adjacent to the first magnet 336, friction of the flowable material 304 flowing between the mandrel 306 and the die body 302, etc.

In some examples, the first magnetic structure 314 is configured to apply a first magnetic force to the mandrel 306, in a first direction. For example, the first magnetic structure 314 may produce a first magnetic field to apply the first magnetic force to the mandrel 306. In some examples, the first magnetic force may be a first repulsive force (e.g., the first magnetic field may push the mandrel 306 in the first direction). In an example where the first magnetic force is the first repulsive force, a pole of the first magnetic structure 314 facing the mandrel 306 may match a pole of the first magnet 336 facing the first magnetic structure 314. For example, a North pole of the first magnetic structure 314 (and/or a negative side of the first magnetic structure 314) may face the mandrel 306 and a North pole of the first magnet 336 (and/or a negative side of the first magnet 336) may face the first magnetic structure 314. Alternatively and/or additionally, a South pole of the first magnetic structure 314 (and/or a positive side of the first magnetic structure 314) may face the mandrel 306 and a South pole of the first magnet 336 (and/or a positive side of the first magnet 336) may face the first magnetic structure 314.

Alternatively and/or additionally, the first magnetic force may be a first attractive force (e.g., the first magnetic field may pull the mandrel 306 in the first direction). In an example where the first magnetic force is the first attractive force, a pole of the first magnetic structure 314 facing the mandrel 306 may be opposite a pole of the first magnet 336 facing the first magnetic structure 314. For example, a North pole of the first magnetic structure 314 (and/or a negative side of the first magnetic structure 314) may face the mandrel 306 and a South pole of the first magnet 336 (and/or a positive side of the first magnet 336) may face the first magnetic structure 314. Alternatively and/or additionally, a South pole of the first magnetic structure 314 (and/or a positive side of the first magnetic structure 314) may face the mandrel 306 and a North pole of the first magnet 336 (and/or a negative side of the first magnet 336) may face the first magnetic structure 314.

In some examples, the second magnetic structure 316 is configured to apply a second magnetic force to the mandrel 306, in a second direction. In some examples, the second direction is opposite the first direction. For example, the second magnetic structure 316 may produce a second magnetic field to apply the second magnetic force to the mandrel 306. In some examples, the second magnetic force may be a second repulsive force (e.g., the second magnetic field may push the mandrel 306 in the second direction). In an example where the second magnetic force is the second repulsive force, a pole of the second magnetic structure 316 facing the mandrel 306 may match a pole of the first magnet 336 facing the second magnetic structure 316. For example, a North pole of the second magnetic structure 316 (and/or a negative side of the second magnetic structure 316) may face the mandrel 306 and a North pole of the first magnet 336 (and/or a negative side of the first magnet 336) may face the second magnetic structure 316. Alternatively and/or additionally, a South pole of the second magnetic structure 316 (and/or a positive side of the second magnetic structure 316) may face the mandrel 306 and a South pole of the first magnet 336 (and/or a positive side of the first magnet 336) may face the second magnetic structure 316.

Alternatively and/or additionally, the second magnetic force may be a second attractive force (e.g., the second magnetic field may pull the mandrel 306 in the second direction). In an example where the second magnetic force is the second attractive force, a pole of the second magnetic structure 316 facing the mandrel 306 may be opposite a pole of the first magnet 336 facing the second magnetic structure 316. For example, a North pole of the second magnetic structure 316 (and/or a negative side of the second magnetic structure 316) may face the mandrel 306 and a South pole of the first magnet 336 (and/or a positive side of the first magnet 336) may face the second magnetic structure 316. Alternatively and/or additionally, a South pole of the second magnetic structure 316 (and/or a positive side of the second magnetic structure 316) may face the mandrel 306 and a North pole of the first magnet 336 (and/or a negative side of the first magnet 336) may face the second magnetic structure 316.

In a first exemplary embodiment, the first magnetic force corresponds to the first repulsive force and the second magnetic force corresponds to the second repulsive force. In the first exemplary embodiment, the first direction of the first magnetic force is the same as a third direction at which the flowable material 304 flows through the die body 302 from the first side 318 of the die body 302 to the second side 320 of the die body 302. In a second exemplary embodiment, the first magnetic force corresponds to the first attractive force and the second magnetic force corresponds to the second attractive force. In the second exemplary embodiment, the first direction of the first magnetic force is opposite the third direction at which the flowable material 304 flows through the die body 302 from the first side 318 of the die body 302 to the second side 320 of the die body 302.

Figure 3E:
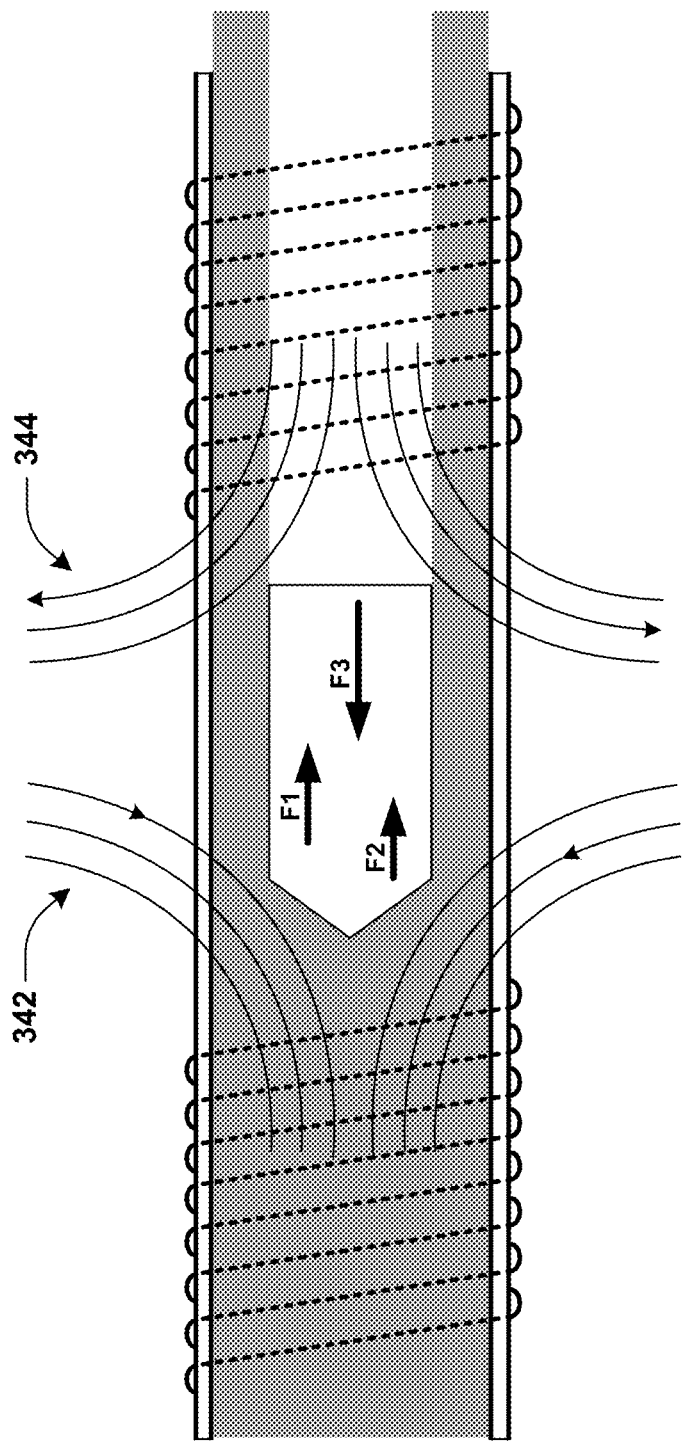
FIG. 3E illustrates an exemplary embodiment of a die structure where a first magnetic force corresponds to a first repulsive force and/or a second magnetic force corresponds to a second repulsive force.

FIG. 3E illustrates an embodiment of the die structure 300 where the first magnetic force corresponds to the first repulsive force and/or the second magnetic force corresponds to the second repulsive force. FIG. 3E illustrates first magnetic flux 342 associated with the first magnetic field produced by the first magnetic structure 314 and/or second magnetic flux 344 associated with the second magnetic field produced by the second magnetic structure 316. In some examples, a South pole of the first magnetic structure 314 (and/or a positive side of the first magnetic structure 314) may face the mandrel 306 and a South pole of the first magnet 336 (and/or a positive side of the first magnet 336) may face the first magnetic structure 314. Alternatively and/or additionally, a North pole of the second magnetic structure 316 (and/or a negative side of the second magnetic structure 316) may face the mandrel 306 and a North pole of the first magnet 336 (and/or a negative side of the first magnet 336) may face the second magnetic structure 316. For example, the South pole (and/or the positive side) of the first magnet 336 may be proximal the first magnetic structure 314 and distal the second magnetic structure 316. Alternatively and/or additionally, the North pole (and/or the negative side) of the first magnet 336 may be proximal the second magnetic structure 316 and distal the first magnetic structure 314.

A first force vector F1 in FIG. 3E is representative of a force applied to the mandrel 306 in the third direction (and/or the first direction) by the flowable material flowing from the first side 318 of the die body 302 to the second side 320 of the die body 302, such as one or more of impact of flowing flowable material on the mandrel 306, friction of the flowing flowable material with the mandrel 306, pressure of the flowable material 304 (e.g., on the first portion 338 of the mandrel 306), etc. Alternatively and/or additionally, a second force vector F2 is representative of the first magnetic force applied to the mandrel 306 in the first direction (and/or the third direction) by the first magnetic structure 314. Alternatively and/or additionally, a third force vector F3 is representative of the second magnetic force applied to the mandrel 306 in the second direction by the second magnetic structure 316. In an example, a magnitude of (and/or an absolute value of) the second force vector F2 (and/or the first magnetic force) may be less than a magnitude of (and/or an absolute value of) the third force vector F3 (and/or the second magnetic force) to balance the third force vector F3 with the first force vector F1 and the second force vector F2.

In some examples, the first magnetic force and/or the second magnetic force cause and/or support the mandrel 306 to be levitated within the die body 302. Alternatively and/or additionally, the first magnetic force and/or the second magnetic force cause and/or support the mandrel 306 to maintain a position within the die body 302. In some examples, application of the first magnetic force and/or the second magnetic force to the mandrel 306 may limit movement of the mandrel 306 in the third direction (at which the flowable material 304 flows through the die body 302) and/or the second direction (opposite the third direction). For example, the first magnetic force and/or the second magnetic force may stabilize the mandrel 306 at the position such that movement of the mandrel 306 in the third direction is limited and/or prevented and/or movement of the mandrel 306 in the second direction is limited and/or prevented. Alternatively and/or additionally, the position of the mandrel 306 may correspond to a center 346 (e.g., a cylindrical center and/or a cross-sectional center) of the die body 302 (illustrated in FIG. 3C) (wherein the center 346 may be midway between two opposing sides of the inner surface of the die body 302). Alternatively and/or additionally, the position of the mandrel 306 may be offset from the center 346 of the die body 302 (e.g., to mitigate a sagging effect of the extrudate being formed). Alternatively and/or additionally, the position of the mandrel 306 may be within the third portion 310 of the die body 302. Alternatively and/or additionally, the position of the mandrel 306 may be between the first portion 308 of the die body 302 and the second portion 312 of the die body 302. Alternatively and/or additionally, the position of the mandrel 306 may extend to within the first portion 308 of the die body 302 and/or within the second portion 312 of the die body 302.

It may be appreciated that the die structure 300 may be configured for use in (and/or in combination with and/or together with) an extrusion machine, such as the first extrusion machine 100 illustrated in FIG. 1 (e.g., the die structure 300 may be configured for use as the die 122).

Figure 4A:
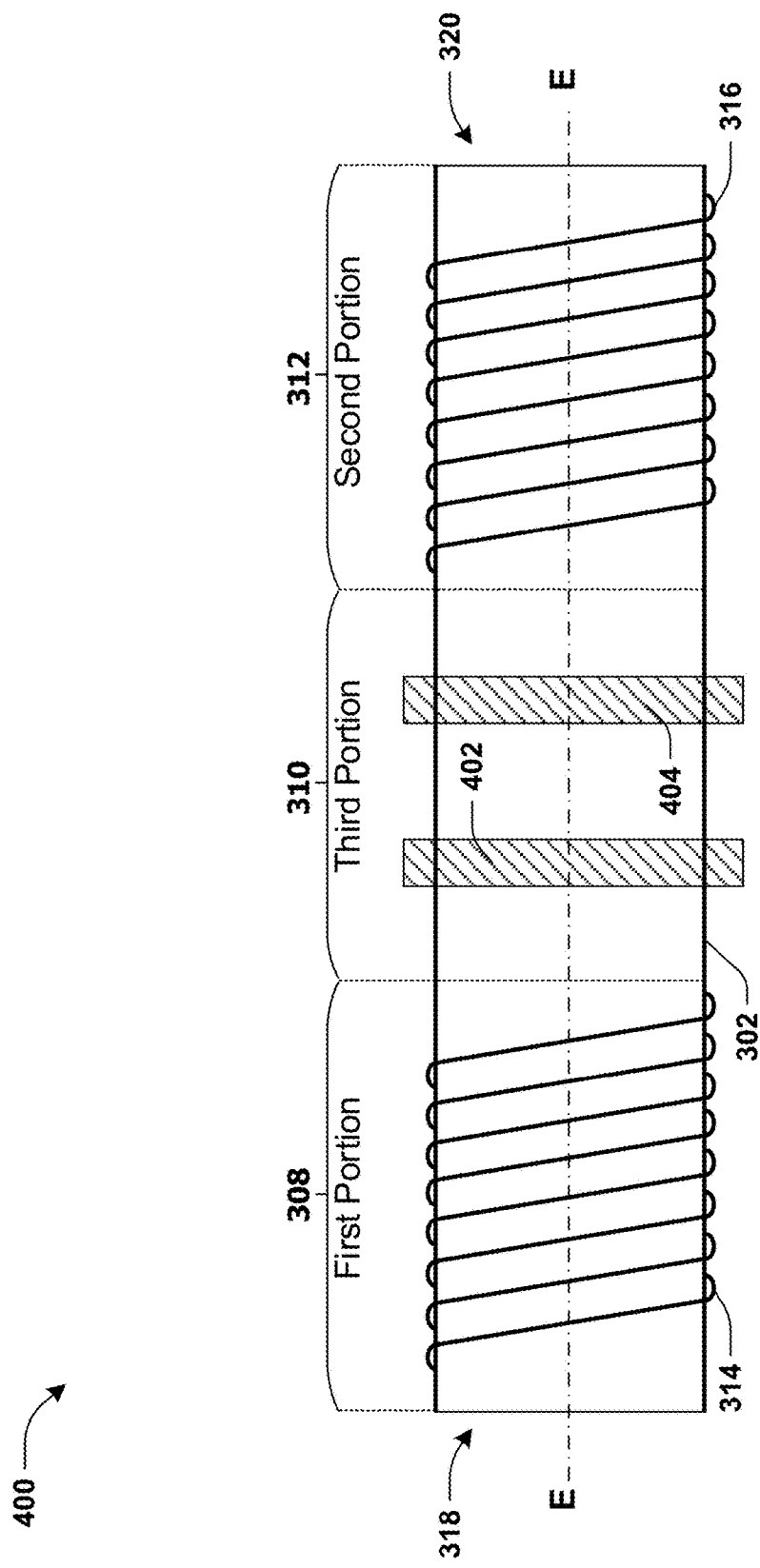
FIG. 4A illustrates an exemplary embodiment of a second die structure.

FIG. 4A illustrates an exemplary embodiment of a second die structure 400. The second die structure 400 may comprise the die body 302 comprising the first side 318 and/or the second side 320. In some examples, the die body 302 may be configured and/or disposed such that flowable material 304 moves from the first side 318 of the die body 302 to the second side 320 of the die body 302. For example, the flowable material 304 may move from the first side 318 of the die body 302 to the second side 320 of the die body 302 (e.g., the flowable material 304 may flow and/or be conducted through the die body 302, from the first side 318 of the die body 302 to the second side 320 of the die body 302). Alternatively and/or additionally, the die body 302 may be configured to conduct the flowable material 304 from the first side 318 of the die body 302 to the second side 320 of the die body 302. For example, the die body 302 may be configured as a path for the flowable material 304 to move and/or flow from the first side 318 of the die body 302 to the second side 320 of the die body 302.

Figure 4B:
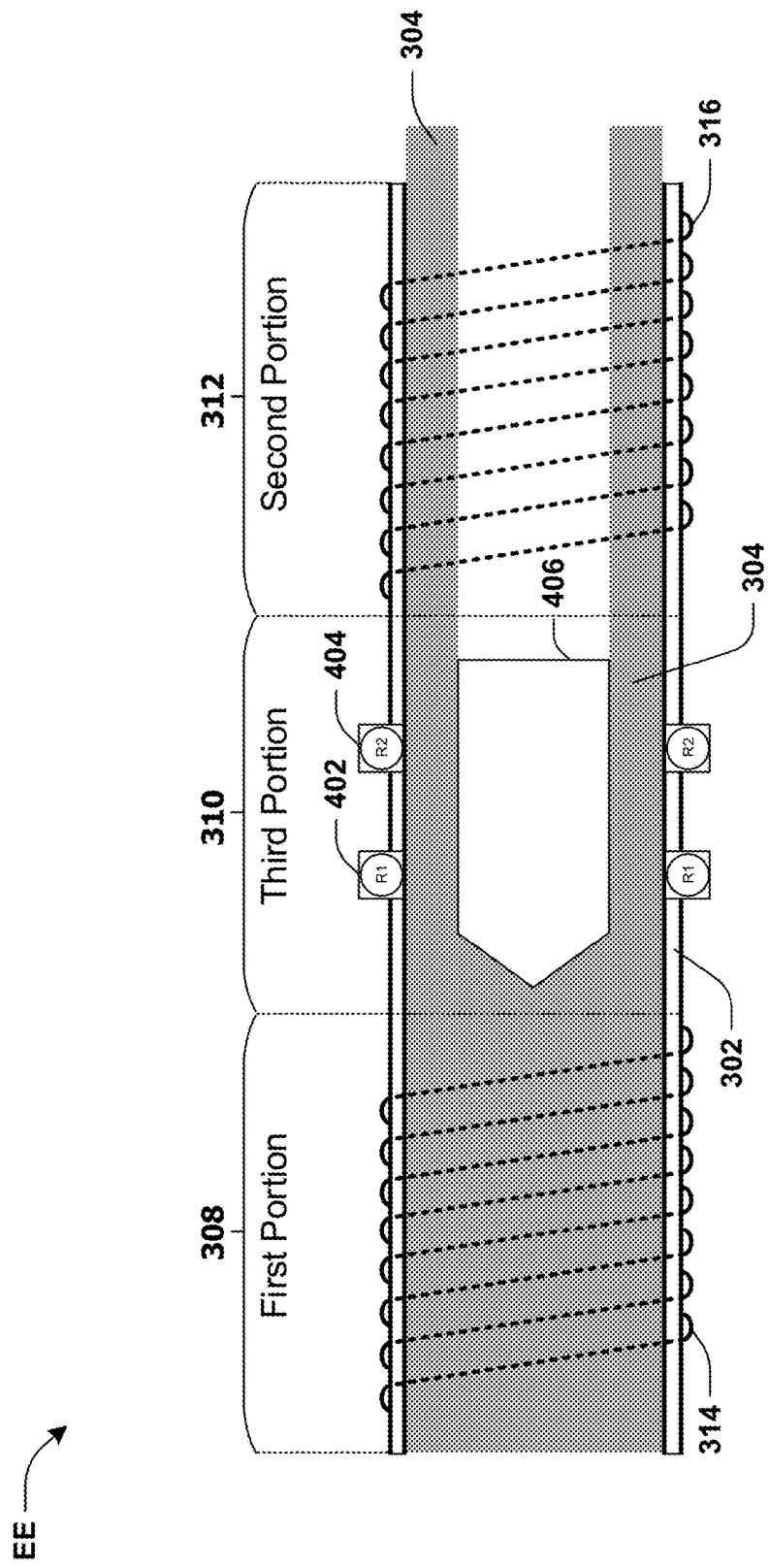
FIG. 4B illustrates a cross-section of a second die structure.

Alternatively and/or additionally, the second die structure 400 may comprise a second mandrel 406 (illustrated in FIG. 4B). In some examples, the second die structure 400 may comprise the first magnetic structure 314 coupled to the first portion 308 of the die body 302 and/or the second magnetic structure 316 coupled to the second portion 312 of the die body 302. In some examples, at least a portion of the second mandrel 406 may be within the third portion 310 of the die body 302. The third portion 310 may be between the first portion 308 of the die body 302 and the second portion 312 of the die body 302.

The second die structure 400 may comprise one or more magnetic structures coupled to the third portion 310 of the die body. In some examples, the one or more magnetic structures may comprise a third magnetic structure 402 coupled to the third portion 310 of the die body and/or a fourth magnetic structure 404 coupled to the third portion 310 of the die body (and/or the one or more magnetic structures may comprise one or more other magnetic structures). In some examples, the third magnetic structure 402 may surround at least a part of the third portion 310 of the die body 302 and/or the fourth magnetic structure 404 may surround at least a part of the third portion 310 of the die body 302.

FIG. 4B illustrates a cross-section EE, defined in FIG. 4A, of the second die structure 400, where the flowable material 304 is conducted from the first side 318 of the die body 302 to the second side 320 of the die body 302. In some examples, the second die structure 400 is configured to form an extrudate as the flowable material 304 flows (and/or is forced, pushed, pulled, pumped and/or screw-pumped) through a space (e.g., a clearance) between the inner surface of the die body 302 and the second mandrel 406 of the second die structure 400. For example, the extrudate may be conducted through the second side 320 of the die body 302 to outside of the second die structure 400.

Figure 4C:
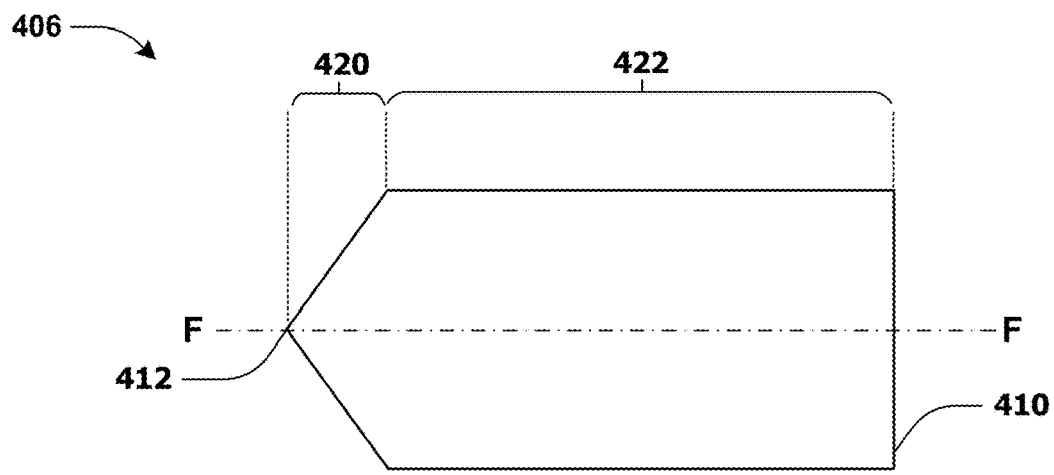
FIG. 4C illustrates a second mandrel.
Figure 4C:
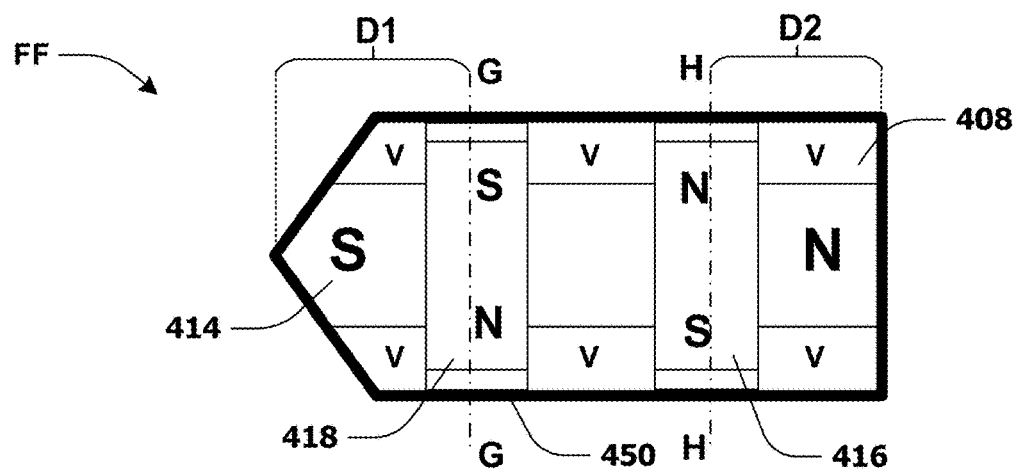
Figure 4C:
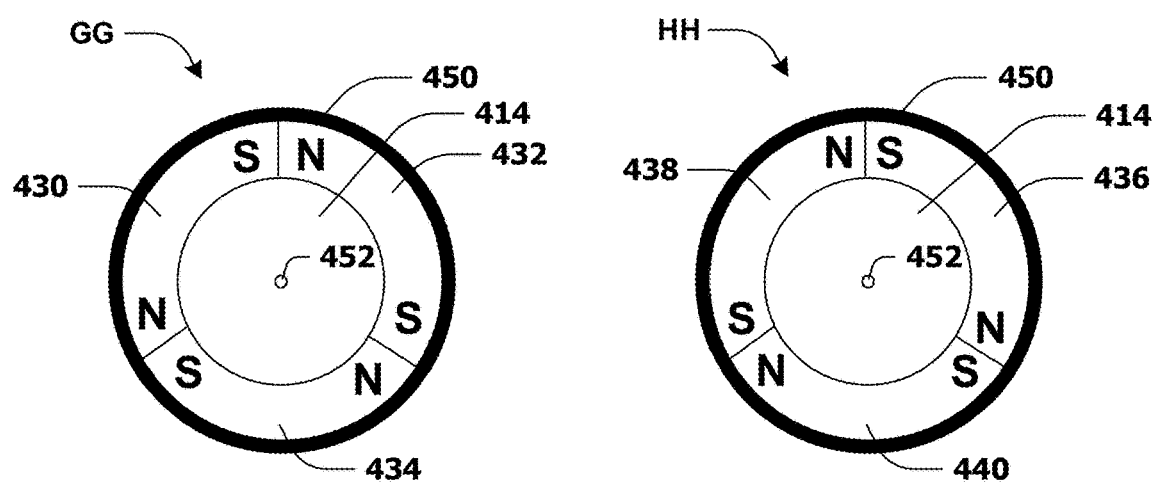

FIG. 4C illustrates the second mandrel 406. In some examples, a first portion 420 of the second mandrel 406 may have an ogive shape, a hemispherical shape, a conical shape, a cylindrical shape and/or a different shape. Alternatively and/or additionally, a second portion 422 of the second mandrel 406 may have a cylindrical shape, a conical shape and/or a different shape. In some examples, the second mandrel 406 may comprise a second magnet 414. In some examples, the second magnet 414 may extend from a first side 412 of the second mandrel 406 to a second side 410 of the second mandrel 406. Alternatively and/or additionally, the second magnet 414 may not extend from the first side 412 of the second mandrel 406 to the second side 410 of the second mandrel 406. The second magnet 414 is illustrated in a cross-section FF, a cross-section GG and a cross-section HH of the second mandrel 406.

In some examples, the second magnet 414 may correspond to a permanent magnet, such as a permanent dipole magnet and/or a hard dipole magnet. FIG. 4C illustrates an embodiment of the second mandrel 406 where a South pole of the second magnet 414 (e.g., a positive side of the second magnet 414) corresponds to the first side 412 of the second mandrel 406 and/or a North pole of the second magnet 414 (e.g., a negative side of the second magnet 414) corresponds to the second side 410 of the second mandrel 406. In a different embodiment, a North pole of the second magnet 414 may correspond to the first side 412 of the second mandrel 406 and/or a South pole of the second magnet 414 may correspond to the second side 410 of the second mandrel 406. In some examples, the second magnet 414 may be resistant to external conditions such as one or more of temperature changes (e.g., the South pole and the North pole of the second magnet 414 may not change positions and/or a magnetic strength of the first magnet 336 may not change considerably as a result of temperature changes of the second magnet 414), humidity, magnetic fields adjacent to the second magnet 414, friction of the flowable material 304 flowing between the second mandrel 406 and the die body 302, etc.

In some examples, the second mandrel 406 may comprise one or more magnet assemblies. For example, the one or more magnet assemblies may comprise a first magnet assembly 418 and/or a second magnet assembly 416 (and/or one or more other magnet assemblies). In some examples, a quantity of magnet assemblies of the one or more magnet assemblies may correspond to a quantity of magnetic structures of the one or more magnetic structures (e.g., in an embodiment where the one or more magnet assemblies of the second mandrel 406 comprises four magnet assemblies, the one or more magnetic structures coupled to the third portion 310 of the die body 302 may comprise four magnetic structures). Alternatively and/or additionally, the quantity of magnet assemblies of the one or more magnet assemblies may be different than a quantity of magnetic structures of the one or more magnetic structures. In some examples, the first magnet assembly 418 may surround and/or enclose a first portion of the second magnet 414 (as illustrated in the cross-section GG of FIG. 4C) and/or the second magnet assembly 416 may surround and/or enclose a second portion of the second magnet 414 (as illustrated in the cross-section HH of FIG. 4C).

In some examples, the first magnet assembly 418 may comprise one or more first magnets. The one or more first magnets may be arranged around the first portion of the second magnet 414 (as illustrated in the cross-section GG of FIG. 4C). The one or more first magnets may comprise an odd (and/or even) number of magnets, such as 3 magnets, 5 magnets, 7 magnets, etc. In some examples, the one or more first magnets may comprise permanent magnets. The one or more first magnets may comprise a first permanent magnet 430, a second permanent magnet 432 and/or a third permanent magnet 434, wherein the first permanent magnet 430, the second permanent magnet 432 and/or the third permanent magnet 434 are connected surrounding the first portion of the second magnet 414.

Alternatively and/or additionally, the second magnet assembly 416 may comprise one or more second magnets. The one or more second magnets may be arranged around the second portion of the second magnet 414 (as illustrated in the cross-section HH of FIG. 4C). The one or more second magnets may comprise an odd (and/or even) number of magnets, such as 3 magnets, 5 magnets, 7 magnets, etc. In some examples, the one or more second magnets may comprise permanent magnets. The one or more second magnets may comprise a fourth permanent magnet 436, a fifth permanent magnet 438 and/or a sixth permanent magnet 440, wherein the fourth permanent magnet 436, the fifth permanent magnet 438 and/or the sixth permanent magnet 440 are connected surrounding the second portion of the second magnet 414.

In some examples, a first distance D1 between the first side 412 of the second mandrel 406 and a center of the first magnet assembly 418 may be ⅓ or approximately ⅓ of a distance between the first side 412 of the second mandrel 406 and the second side 410 of the second mandrel 406. Alternatively and/or additionally, the first distance D1 may be greater than or less than ⅓ of the distance between the first side 412 of the second mandrel 406 and the second side 410 of the second mandrel 406. Alternatively and/or additionally, a second distance D2 between the second side 410 of the second mandrel 406 and a center of the second magnet assembly 416 may be ⅓ or approximately ⅓ of the distance between the first side 412 of the second mandrel 406 and the second side 410 of the second mandrel 406. Alternatively and/or additionally, the second distance D2 may be greater than or less than ⅓ of the distance between the first side 412 of the second mandrel 406 and the second side 410 of the second mandrel 406.

In some examples, the second mandrel 406 may comprise one or more chambers 408 (e.g., one or more enclosed spaces), labeled in FIG. 4C as "V". In some examples, the one or more chambers 408 may correspond to one or more empty spaces (e.g., one or more hollows, one or more cavities, one or more voids, etc.) within the second mandrel 406. Alternatively and/or additionally, the one or more chambers 408 may be at least partially filled with one or more of a gas, a liquid, a solid material (e.g., wood, plastic, etc.), etc. The one or more chambers 408, the one or more magnet assemblies and/or the second magnet 414 may be arranged within a second mandrel shell 450 of the second mandrel 406 (e.g., an outer mandrel layer 450 of the second mandrel 406). In some examples, a first chamber of the one or more chambers 408 may be between the first side 412 of the second mandrel 406 and the first magnet assembly 418. Alternatively and/or additionally, a second chamber of the one or more chambers 408 may be between the first magnet assembly 418 and the second magnet assembly 416. Alternatively and/or additionally, a third chamber of the one or more chambers 408 may be between the second magnet assembly 416 and the second side 410 of the second mandrel 406. It may be appreciated that the one or more chambers 408 being at least partially filled with material (and/or a lack of material) having a density lower than a density of the flowable material 304, a buoyancy force may be applied on the second mandrel 406 in a direction opposite the force of gravity (e.g., such that a weight of the second mandrel 406 is at least partially compensated).

In some examples, the first magnetic structure 314 is configured to apply a first magnetic force to the second mandrel 406, in a first direction. For example, the first magnetic structure 314 may produce a first magnetic field to apply the first magnetic force to the second mandrel 406. In some examples, the first magnetic force may be a first repulsive force (e.g., the first magnetic field may push the second mandrel 406 in the first direction). In an example where the first magnetic force is the first repulsive force, a pole of the first magnetic structure 314 facing the second mandrel 406 may match a pole of the second magnet 414 facing the first magnetic structure 314. In some examples, the first direction of the first magnetic force is the same as a third direction at which the flowable material 304 flows through the die body 302 from the first side 318 of the die body 302 to the second side 320 of the die body 302.

In some examples, the second magnetic structure 316 is configured to apply a second magnetic force to the second mandrel 406, in a second direction. In some examples, the second direction is opposite the first direction. For example, the second magnetic structure 316 may produce a second magnetic field to apply the second magnetic force to the second mandrel 406. In some examples, the second magnetic force may be a second repulsive force (e.g., the second magnetic field may push the second mandrel 406 in the second direction). In an example where the second magnetic force is the second repulsive force, a pole of the second magnetic structure 316 facing the second mandrel 406 may match a pole of the second magnet 414 facing the second magnetic structure 316.

In another embodiment, the first magnetic force may be a first attractive force applied to the second mandrel 406 in the second direction and/or the second magnetic force may be a second attractive force applied to the second mandrel 406 in the first direction.

In some examples, the one or more magnetic structures are configured to apply one or more magnetic forces to the second mandrel 406. For example, the third magnetic structure 402, of the one or more magnetic structures, is configured to apply a third magnetic force, of the one or more magnetic forces, to the second mandrel 406. Alternatively and/or additionally, the fourth magnetic structure 404, of the one or more magnetic structures, is configured to apply a fourth magnetic force, of the one or more magnetic forces, to the second mandrel 406. In some examples, application of the one or more magnetic forces (e.g., the third magnetic force and/or the fourth magnetic force) to the second mandrel 406 causes rotation of the second mandrel 406 around a first axis of rotation 452 of the second mandrel 406 (illustrated in cross-section GG and cross-section HH of FIG. 4C).

In some examples, a magnetic structure of the one or more magnetic structures (such as the third magnetic structure 402 and/or the fourth magnetic structure 404) may comprise a switching and/or alternative magnetic field source that applies oscillating magnetic flux on a magnet assembly of the one or more magnet assemblies within the second mandrel 406. For example, the third magnetic structure 402 may comprise a first switching and/or alternative magnetic field source that produces a magnetic field applying first oscillating and/or alternative magnetic flux on the first magnet assembly 418 associated with the third magnetic structure 402. Alternatively and/or additionally, the fourth magnetic structure 404 may comprise a second switching and/or alternative magnetic field source that produces a magnetic field applying second oscillating and/or alternative magnetic flux on the second magnet assembly 416 associated with the fourth magnetic structure 404. In some examples, application of the first oscillating and/or alternative magnetic flux on the first magnet assembly 418 and/or application of the second oscillating and/or alternative magnetic flux on the second magnet assembly 416 causes the second mandrel 406 to rotate around the first axis of rotation 452.

In some examples, the one or more magnetic structures (such as the third magnetic structure 402 and/or the fourth magnetic structure 404) may comprise one or more electromagnet structures. For example, an electromagnet structure of the one or more electromagnet structures may comprise a coil (of wire). In some examples, the electromagnet structure may comprise a toroidal magnetic structure surrounding at least a part of the third portion 310 of the die body 302. Alternatively and/or additionally, electrical current pulses (e.g., such as oscillating direct current and/or alternating current) may be input to windings of the coil to produce a changing magnetic field having changing and/or moving North and/or South poles. In some examples, one or more changing magnetic fields having changing and/or moving North and/or South poles produced by the one or more electromagnet structures (such as the third magnetic structure 402 and/or the fourth magnetic structure 404) may cause the second mandrel 406 to rotate around the first axis of rotation 452. For example, the one or more changing magnetic fields produced by the one or more electromagnet structures may interact with one or more magnet assemblies (such as the first magnet assembly 418 and/or the second magnet assembly 416) to cause the second mandrel 406 to rotate around the first axis of rotation 452. Alternatively and/or additionally, the one or more magnetic forces applied to the second mandrel 406 may correspond to one or more rotational driving forces applied to the second mandrel 406, where the one or more rotational driving forces may be caused by the one or more changing magnetic fields produced by the one or more electromagnet structures and/or the one or more magnetic fields produced by the one or more magnet assemblies.

In an example, the third magnetic structure 402 may comprise a first electromagnet structure and/or the fourth magnetic structure 404 may comprise a second electromagnet structure. Electric current (e.g., one or more of current pulses, oscillating direct current and/or alternating current) may be input to the first electromagnet structure and/or the second electromagnet structure. The first electromagnet structure may produce a first changing magnetic field having changing and/or moving North and/or South poles (as a result of current traveling through the first electromagnet structure). The second electromagnet structure may produce a second changing magnetic field having changing and/or moving North and/or South poles (as a result of current traveling through the second electromagnet structure). The first changing magnetic field may interact with the first magnet assembly 418 and/or the second changing magnetic field may interact with the second magnet assembly 416 to rotate the second mandrel 406 around the first axis of rotation 452.

In some examples, the one or more magnetic structures (such as the third magnetic structure 402 and/or the fourth magnetic structure 404) may comprise one or more permanent magnet structures. For example, a permanent magnet structure of the one or more permanent magnet structures may comprise a hollow structure surrounding at least a part of the third portion 310 of the die body 302. The permanent magnet structure may comprise one or more magnets. The permanent magnet structure (and/or the one or more magnets of the permanent magnet structure) may rotate around the die body 302 to produce a changing and/or rotating magnetic field having changing and/or moving North and/or South poles. In some examples, the permanent magnet structure may be rotated and/or driven by a motor and/or a rotor (and/or by a different mechanical and/or electromechanical device configured to rotate the permanent magnet structure around the die body 302). In some examples, changing and/or rotating magnetic fields having changing and/or moving (e.g., rotating) North and/or South poles produced by the one or more permanent magnet structures (such as the third magnetic structure 402 and/or the fourth magnetic structure 404) may cause the second mandrel 406 to rotate around the first axis of rotation 452. For example, the one or more changing and/or rotating magnetic fields produced by the one or more permanent magnet structures may interact with the one or more magnet assemblies (such as the first magnet assembly 418 and/or the second magnet assembly 416) to cause the second mandrel 406 to rotate around the first axis of rotation 452. Alternatively and/or additionally, the one or more magnetic forces applied to the second mandrel 406 may correspond to one or more rotational driving forces applied to the second mandrel 406, where the one or more rotational driving forces may be caused by the one or more changing and/or rotating magnetic fields produced by the one or more permanent magnet structures and/or the one or more magnetic fields produced by the one or more magnet assemblies.

In an example, the third magnetic structure 402 may comprise a first permanent magnet structure and/or the fourth magnetic structure 404 may comprise a second permanent magnet structure. The first permanent magnet structure and/or the second permanent magnet structure may be rotated and/or driven by one or more motors and/or one or more rotors. The first permanent magnet structure may produce a first changing and/or rotating magnetic field having changing and/or moving North and/or South poles (as a result of rotation of the first permanent magnet structure around the die body 302). The second permanent magnet structure may produce a second changing and/or rotating magnetic field having changing and/or moving North and/or South poles (as a result of rotation of the second permanent magnet structure around the die body 302). The first changing magnetic field may interact with the first magnet assembly 418 and/or the second changing magnetic field may interact with the second magnet assembly 416 to rotate the second mandrel 406 around the first axis of rotation 452.

In some examples, at a first state of the second mandrel 406, the one or more magnetic forces applied to the second mandrel 406 by the one or more magnetic structures (such as the third magnetic structure 402 and/or the fourth magnetic structure 404) may correspond to a first level of rotational driving force applied to the second mandrel 406 to overcome friction between the second mandrel 406 and the flowable material 504 flowing from the first side 318 of the die body 302 to the second side 320 of the die body 302 (and/or to bring the second mandrel 406 into rotation). For example, the first state of the second mandrel 406 may correspond to a state at which the second mandrel 406 is not rotating and/or not rotating at a first rotational speed (e.g., a desired angular velocity). Alternatively and/or additionally, at a second state of the second mandrel 406, the one or more magnetic forces applied to the second mandrel 406 by the one or more magnetic structures (such as the third magnetic structure 402 and/or the fourth magnetic structure 404) may correspond to a second level of rotational driving force applied to the second mandrel 406 to compensate the friction between the second mandrel 406 and the flowable material 504 and/or to maintain rotation of the second mandrel 406 (e.g., maintain rotation of the second mandrel 406 at the first rotational speed). For example, the second state of the second mandrel 406 may correspond to a state at which the second mandrel 406 is rotating at the first rotational speed (e.g., the desired angular velocity). In some examples, the second level of rotational driving force associated with the second state of the second mandrel 406 may be less than (and/or may not be less than) the first level of rotational driving force associated with the first state of the second mandrel 406.

In some examples, the first magnetic force, the second magnetic force and/or the one or more magnetic forces to the second mandrel 406 may support the second mandrel 406 to be levitated within the die body 302 and/or cause the second mandrel 406 to maintain a position within the die body 302. Alternatively and/or additionally, the position of the second mandrel 406 may be within the third portion 310 of the die body 302. Alternatively and/or additionally, the position of the second mandrel 406 may be between the first portion 308 of the die body 302 and the second portion 312 of the die body 302. In some examples, a portion of the second mandrel 406 may be positioned within the first portion 308 of the die body 302 and/or the second portion 312 of the die body 302. In some examples, application of the first magnetic force and/or the second magnetic force to the second mandrel 406 may limit movement of the second mandrel 406 in the third direction (at which the flowable material 304 flows through the die body 302) and/or the second direction (opposite the third direction). For example, the first magnetic force and/or the second magnetic force may stabilize the second mandrel 406 at the position such that movement of the second mandrel 406 in the third direction is controlled, limited and/or prevented and/or movement of the second mandrel 406 in the second direction is controlled, limited and/or prevented.

Alternatively and/or additionally, the position of the second mandrel 406 may correspond to a center (e.g., a cylindrical center and/or a cross-sectional center) of the die body 302 (wherein the center may be midway between two opposing sides of the inner surface of the die body 302). Alternatively and/or additionally, the position of the second mandrel 406 may be offset from the center of the die body 302 (e.g., to mitigate a sagging effect of the extrudate being formed). In some examples, application of the one or more magnetic forces (such as the third magnetic force and/or the fourth magnetic force) to the second mandrel 406 by the one or more magnetic structures (such as the third magnetic structure 402 and/or the second magnetic structure 404) may control, limit and/or prevent movement of the second mandrel 406 towards and/or away from an inner surface of the die body 302. For example, the one or more magnetic forces may stabilize the second mandrel 406 at the position such that movement of the second mandrel 406 towards and/or away from an inner surface of the die body 302 is controlled, limited and/or prevented. For example, the second mandrel 406 may be stabilized at the position such that movement of the second mandrel 406 in a fourth direction perpendicular to the third direction and/or the second direction is controlled, limited and/or prevented. Alternatively and/or additionally, the second mandrel 406 may be stabilized at the position such that movement of the second mandrel 406 in a direction other than the fourth direction is controlled, limited and/or prevented. In some examples, when the position of the second mandrel 406 is stabilized, the second mandrel 406 may rotate. Alternatively and/or additionally, when the position of the second mandrel 406 is stabilized, the second mandrel 406 may not rotate.

In some examples, the die body 302 may be arranged horizontally and/or the flowable material 304 may flow horizontally from the first side 318 of the die body 302 to the second side 320 of the die body 302 (e.g., horizontal may correspond to perpendicular (and/or approximately perpendicular) to the direction of the force of Earth's gravity). For example, the first side 318 of the die body 302 may be level with the second side 320 of the die body 302.

Alternatively and/or additionally, the die body 302 may be arranged at an upwards angle and/or the flowable material 304 may flow from the first side 318 of the die body 302 to the second side 320 of the die body 302 at the upwards angle. For example, the first side 318 of the die body 302 may be lower (e.g., at a lower elevation) than the second side 320 of the die body 302.

Alternatively and/or additionally, the die body 302 may be arranged at a downwards angle and/or the flowable material 304 may flow from the first side 318 of the die body 302 to the second side 320 of the die body 302 at the downwards angle. For example, the first side 318 of the die body 302 may be higher (e.g., at a higher elevation) than the second side 320 of the die body 302.

Alternatively and/or additionally, the die body 302 may be arranged vertically and/or the flowable material 304 may flow vertically from the first side 318 of the die body 302 to the second side 320 of the die body 302 (e.g., vertical may correspond to parallel (and/or approximately parallel) to the direction of the force of Earth's gravity).

For example, the die body 302 may be arranged vertically downwards such that the first side 318 of the die body 302 is above the second side 320 of the die body 302 and/or such that the flowable material 304 flows vertically downwards from the first side 318 of the die body 302 to the second side 320 of the die body 302.

Alternatively and/or additionally, the die body 302 may be arranged vertically upwards such that the first side 318 of the die body 302 is below the second side 320 of the die body 302 and/or such that the flowable material 304 flows vertically upwards from the first side 318 of the die body 302 to the second side 320 of the die body 302.

It may be appreciated that arranging the die body 302 vertically (e.g., vertically downwards and/or vertically upwards) may prevent and/or mitigate a sagging effect associated with forming the extrudate as the flowable material 304 flows (and/or is forced, pushed, pulled, pumped and/or screw-pumped) through and/or out of a space (e.g., a clearance) between the inner surface of the die body 302 and the second mandrel 406. Accordingly, the second mandrel 406 may be positioned at the center of the die body 302 while achieving a homogeneous thickness over a circumference of the extrudate (e.g., it may not be necessary to position the second mandrel 406 off-center to achieve the homogenous thickness, whereas if the die body 302 is arranged horizontally and/or at an angle, it may be necessary to position the second mandrel 406 off-center to achieve the homogeneous thickness).

It may be appreciated that arranging the die body 302 vertically upwards may improve a continuity of the flowable material 304 flowing from the first side 318 of the die body 302 to the second side 320, as compared to arranging the die body 302 vertically downwards, horizontally and/or at an angle, which may result in an improvement in quality of the extrudate formed as the flowable material 304 flows (and/or is forced, pushed, pulled, pumped and/or screw-pumped) through and/or out of a space (e.g., a clearance) between the inner surface of the die body 302 and the second mandrel 406.

It may be appreciated that the second die structure 400 may be configured for use in (and/or in combination with and/or together with) an extrusion machine, such as the first extrusion machine 100 illustrated in FIG. 1 (e.g., the second die structure 400 may be configured for use as the die 122).

It may be appreciated that by using one or more of the structures and/or techniques presented herein, an extrudate (e.g., a pipe, a multi-layer pipe, a tube, a hose, an annulus film and/or different extrudate used to form bags, etc.) may be produced having improved mechanical properties, such as an improved uniformity, improved strength, etc. For example, by using the die structure 300 illustrated in FIGS. 3A-3E and/or the second die structure 400 illustrated in FIGS. 4A-4C, the flowable material 304 may pass through a space (e.g. a clearance) between the inner surface of the die body 302 and a mandrel (e.g., the mandrel 306 and/or the second mandrel 406) to form the extrudate without the flowable material 304 (e.g., material stream) separating and/or reconnecting at mechanical supports (e.g., due to using magnetic structures to levitate and/or maintain the position of the mandrel rather than (and/or in addition to) using mechanical supports). Thus, connection lines due to separations and/or reconnections of flowable material may not be formed within the extrudate.

Further, one or more of the structures and/or techniques presented herein may be used to produce products with hollow profiles, micro-scaled and/or nano-scaled extrudates, such as for use in medicine (e.g., artificial veins) and/or other products having the improved mechanical properties (as a result of using magnetic structures to levitate and/or maintain the position of the mandrel rather than (and/or in addition to) using mechanical supports).

It may be appreciated that embodiments described herein are exemplary and/or illustrative, and that any combination of one or more of the components described herein are contemplated.

An embodiment of the die structure 300 is contemplated where the die structure 300 comprises merely one of the first magnetic structure 314 or the second magnetic structure 316 (such as merely the first magnetic structure 314 or merely the second magnetic structure 316). For example, a magnetic force applied by merely one of the first magnetic structure 314 or the second magnetic structure 316 may cause and/or support the mandrel 306 to be levitated within the die body 302 and/or to maintain a position within the die body 302.

An embodiment of the die structure 400 is contemplated where the die structure 400 comprises merely one of the first magnetic structure 314, the second magnetic structure 316 or the one or more magnetic structures (such as merely the first magnetic structure 314, merely the second magnetic structure 316 or merely the one or more magnetic structures). For example, a magnetic force applied by merely one of the first magnetic structure 314, the second magnetic structure 316 or the one or more magnetic structures may cause and/or support the mandrel 306 to be levitated within the die body 302 and/or to maintain a position within the die body 302.

Alternatively and/or additionally, an embodiment of the die structure 400 is contemplated where the die structure 400 comprises two of the first magnetic structure 314, the second magnetic structure 316 or the one or more magnetic structures. For example, magnetic forces applied by merely two of the first magnetic structure 314, the second magnetic structure 316 or the one or more magnetic structures may cause and/or support the mandrel 306 to be levitated within the die body 302 and/or to maintain a position within the die body 302.

An extrusion machine is provided. In an embodiment, the extrusion machine may comprise one or more components configured to conduct flowable material to and/or through a die structure. The die structure may correspond to the die structure 300, the die structure 400 or a different die structure, such as one or more of a basket die, a lattice basket die, a dividing sleeve die, a screen pack die, a helix die, a different die for extrusion, etc. The flowable material may flow through the die structure to form an extrudate. The flowable material may flow vertically, such as vertically upwards and/or vertically downwards.

Unless specified otherwise, "first," "second," and/or the like are not intended to imply a temporal aspect, a spatial aspect, an ordering, discreteness, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B, at least one of A or B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An extrusion machine, comprising:
  a die structure, comprising:
    a die body;
    a mandrel, comprising:
      a first magnet extending from a first side of the mandrel to a second side of the mandrel; and
      one or more magnet assemblies, wherein a first magnet assembly of the one or more magnet assemblies comprises one or more first magnets;
    a first magnetic structure coupled to a first portion of the die body;
    a second magnetic structure coupled to a second portion of the die body; and
    one or more magnetic structures coupled to a third portion of the die body, wherein:
      the third portion of the die body is between the first portion of the die body and the second portion of the die body;
      at least a portion of the mandrel is within the third portion of the die body;
      the first magnetic structure is configured to apply a first magnetic force to the mandrel, in a first direction;
      the second magnetic structure is configured to apply a second magnetic force to the mandrel, in a second direction opposite the first direction;
      the one or more magnetic structures are configured to apply one or more magnetic forces to the mandrel; and
      application of at least one of the first magnetic force, the second magnetic force or the one or more magnetic forces to the mandrel supports the mandrel to be levitated within the die body and causes the mandrel to maintain a position within the die body.

2. The extrusion machine of claim 1, comprising:
  one or more components configured to conduct a flowable material to the die structure, wherein the die structure is configured to form an extrudate as the flowable material flows through a space between an inner surface of the die body and the mandrel of the die structure.

3. The extrusion machine of claim 2, wherein:
  the die body comprises a first side and a second side; and
  the die body is configured such that the flowable material moves in a third direction from the first side of the die body to the second side of the die body.

4. The extrusion machine of claim 3, wherein:
  the first side of the die body is below the second side of the die body.

5. The extrusion machine of claim 3, wherein:
  the first side of the die body is above the second side of the die body.

6. The extrusion machine of claim 3, wherein:
  the third direction is the same as the first direction.

7. The extrusion machine of claim 1, wherein:
  the first portion of the die body is proximal the first side of the mandrel and distal the second side of the mandrel; and
  the second portion of the die body is proximal the second side of the mandrel and distal the first side of the mandrel.

8. The extrusion machine of claim 1, wherein:
  the first magnetic force is a first repulsive force; and
  the second magnetic force is a second repulsive force.

9. The extrusion machine of claim 1, wherein:
  application of the one or more magnetic forces to the mandrel causes rotation of the mandrel around a first axis of rotation of the mandrel.

10. The extrusion machine of claim 1, wherein:
  the first magnetic structure comprises at least one of a permanent magnet or an electromagnet;
  the second magnetic structure comprises at least one of a permanent magnet or an electromagnet; and
  the one or more magnetic structures comprise at least one of one or more permanent magnets or one or more electromagnets.

11. The extrusion machine of claim 1, wherein:
  a first portion of the mandrel has at least one of a cylindrical shape, an ogive shape, a truncated ogive shape, a hemispherical shape, a truncated hemispherical shape, a conical shape or a truncated conical shape;
  a second portion of the mandrel has at least one of a cylindrical shape, an ogive shape, a truncated ogive shape, a hemispherical shape, a truncated hemispherical shape, a conical shape or a truncated conical shape;
  the first portion of the mandrel corresponds to the first side of the mandrel; and
  the second portion of the mandrel corresponds to the second side of the mandrel.

12. The extrusion machine of claim 1, wherein:
  the one or more magnet assemblies comprises a second magnet assembly comprising one or more second magnets;
  the one or more magnetic structures comprises a third magnetic structures:
  the one or more magnetic structures comprises a fourth magnetic structures;
  a first magnetic field of the third magnetic structure interacts with the first magnet assembly; and
  a second magnetic field of the fourth magnetic structure interacts with the second magnet assembly.

13. The extrusion machine of claim 12, wherein:
  the first magnet assembly surrounds a first portion of the first magnet extending from the first side of the mandrel to the second side of the mandrel; and
  the second magnet assembly surrounds a second portion of the first magnet extending from the first side of the mandrel to the second side of the mandrel.

14. The extrusion machine of claim 13, wherein at least one of:
the mandrel comprises a first chamber between the first magnet assembly and the first side of the mandrel;
the mandrel comprises a second chamber between the first magnet assembly and the second magnet assembly; or
the mandrel comprises a third chamber between the second magnet assembly and the second side of the mandrel.

15. The extrusion machine of claim 1, wherein:
the one or more magnetic structures comprises a third magnetic structure, wherein a magnetic field of the third magnetic structure interacts with the first magnet assembly, and wherein the third magnetic structure is configured to rotate around the die body to induce rotation of the mandrel around a first axis of rotation of the mandrel.

16. The extrusion machine of claim 1, wherein:
the mandrel is within the third portion of the die body.

17. A die structure, comprising:
a die body;
a mandrel comprising:
  a first magnet; and
  one or more magnet assemblies, wherein a first magnet assembly of the one or more magnet assemblies comprises one or more first magnets;
a first magnetic structure coupled to a first portion of the die body;
a second magnetic structure coupled to a second portion of the die body; and
one or more magnetic structures coupled to a third portion of the die body, wherein:
  at least a portion of the mandrel is within the third portion of the die body;
  the third portion of the die body is between the first portion of the die body and the second portion of the die body;
  the first magnetic structure is configured to apply a first magnetic force to the mandrel, in a first direction;
  the second magnetic structure is configured to apply a second magnetic force to the mandrel, in a second direction opposite the first direction;
  the one or more magnetic structures are configured to apply one or more magnetic forces to the mandrel;
  application of at least one of the first magnetic force, the second magnetic force or the one or more magnetic forces to the mandrel supports the mandrel to be levitated within the die body and causes the mandrel to maintain a position within the die body; and
  application of the one or more magnetic forces to the mandrel causes rotation of the mandrel around a first axis of rotation of the mandrel.

18. The die structure of claim 17, wherein:
application of the first magnetic force and the second magnetic force to the mandrel supports the mandrel to be levitated within the die body and causes the mandrel to maintain a position within the die body.

19. An extrusion machine, comprising:
a die structure, comprising:
  a die body;
  a mandrel, comprising:
    a first magnet extending from a first side of the mandrel to a second side of the mandrel;
    one or more magnet assemblies, wherein a first magnet assembly of the one or more magnet assemblies comprises one or more first magnets; and
    one or more chambers, wherein:
      a first chamber of the one or more chambers is between the first magnet assembly and the first side of the mandrel; and
      the one or more magnet assemblies, the one or more chambers and the first magnet extending from the first side of the mandrel to the second side of the mandrel are within a mandrel shell of the mandrel;
  a first magnetic structure coupled to a first portion of the die body;
  a second magnetic structure coupled to a second portion of the die body; and
  one or more magnetic structures coupled to a third portion of the die body, wherein:
    the third portion of the die body is between the first portion of the die body and the second portion of the die body;
    at least a portion of the mandrel is within the third portion of the die body;
    the first magnetic structure is configured to apply a first magnetic force to the mandrel, in a first direction;
    the second magnetic structure is configured to apply a second magnetic force to the mandrel, in a second direction opposite the first direction;
    the one or more magnetic structures are configured to apply one or more magnetic forces to the mandrel; and
    application of at least one of the first magnetic force, the second magnetic force or the one or more magnetic forces to the mandrel supports the mandrel to be levitated within the die body and causes the mandrel to maintain a position within the die body.

20. The extrusion machine of claim 19, wherein:
the first magnetic force is a first repulsive force; and
the second magnetic force is a second repulsive force.

* * * * *